(12) United States Patent
Vinogradov

(10) Patent No.: US 8,387,884 B2
(45) Date of Patent: Mar. 5, 2013

(54) VARIABLE FOCUS IMAGING LENS ASSEMBLY FOR AN IMAGING-BASED BAR CODE READER

(75) Inventor: Igor Vinogradov, New York, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1446 days.

(21) Appl. No.: 11/756,052

(22) Filed: May 31, 2007

(65) Prior Publication Data

US 2008/0296385 A1 Dec. 4, 2008

(51) Int. Cl.
*G06K 7/10* (2006.01)
(52) U.S. Cl. ................................ 235/462.42
(58) Field of Classification Search .............. 235/435, 235/439, 454, 462.01, 462.22, 462.23
See application file for complete search history.

(56) References Cited

U.S. PATENT DOCUMENTS

| | | | |
|---|---|---|---|
| 5,756,981 A * | 5/1998 | Roustaei et al. | 235/462.42 |
| 6,138,915 A | 10/2000 | Danielson et al. | |
| 7,201,318 B2 | 4/2007 | Craen et al. | |
| 2004/0118919 A1 | 6/2004 | Breytman et al. | |
| 2005/0199725 A1* | 9/2005 | Craen et al. | 235/462.22 |
| 2005/0269411 A1* | 12/2005 | Vesikivi et al. | 235/462.01 |
| 2006/0038017 A1 | 2/2006 | Carlson et al. | |
| 2006/0202038 A1 | 9/2006 | Wang et al. | |
| 2006/0232700 A1* | 10/2006 | Ito et al. | 348/345 |
| 2007/0063043 A1* | 3/2007 | Heinrich | 235/454 |

OTHER PUBLICATIONS

International Search Report and Written Opinion (13 pages) for International Application No. PCT/2008/065073, mailing date Sep. 16, 2008.
International Preliminary Report on Patentability for International Application No. PCT/US2008/065073 mailed on Dec. 10, 2009.

* cited by examiner

*Primary Examiner* — Thien M Le
*Assistant Examiner* — Christopher Stanford
(74) *Attorney, Agent, or Firm* — Nong-Qiang Fan

(57) ABSTRACT

A variable focus imaging lens assembly (50) for an imaging-based bar code reader (10) including: a lens assembly (52) focusing light from a field of view (FV) onto a sensor array (28), the lens assembly (52) including a lens (53) movable along a path of travel; a drive mechanism (58) to drive the moving lens (53); a focusing system (60) for establishing a reference point (RP) for the moving lens (53) along the path of travel corresponding to a reference focal plane (RFP) within the field of view; and a projection assembly (62) projecting a virtual target image (64a) of a reference target light source (64) to a predetermined position (P) within the field of view and coincident with the reference focal plane (RFP), the predetermined position (P) being a known distance (D) from the lens assembly (52) along its optic axis (OA).

25 Claims, 9 Drawing Sheets

VARIABLE FOCUS IMAGING LENS ASSEMBLY FOR AN IMAGING-BASED BAR CODE READER

FIELD OF THE INVENTION

The present invention relates to a variable focus imaging lens assembly for an imaging-based bar code reader and, more particularly, to a variable focus imaging lens assembly for an imaging-based bar code reader providing for optical calibration to determine a reference position for a variable focus lens of the imaging lens assembly corresponding to a reference focal plane.

BACKGROUND ART

Various electro-optical systems have been developed for reading optical indicia, such as bar codes. A bar code is a coded pattern of graphical indicia comprised of a series of bars and spaces of varying widths, the bars and spaces having differing light reflecting characteristics. Some of the more popular bar code symbologies include: Uniform Product Code (UPC), typically used in retail stores sales; Data Matrix, typically used for labeling small electronic products; Code 39, primarily used in inventory tracking; and Postnet, which is used for encoding zip codes for U.S. mail. Bar codes may be one dimensional (1D), i.e., a single row of graphical indicia such as a UPC bar code or two dimensional (2D), i.e., multiple rows of graphical indicia comprising a single bar code, such as Data Matrix which comprising multiple rows and columns of black and white square modules arranged in a square or rectangular pattern.

Systems that read bar codes (bar code readers) electro-optically transform the graphic indicia into electrical signals, which are decoded into alphanumerical characters that are intended to be descriptive of the article or some characteristic thereof. The characters are then typically represented in digital form and utilized as an input to a data processing system for various end-user applications such as point-of-sale processing, inventory control and the like.

Bar code readers that read and decode bar codes employing imaging systems are typically referred to as imaging-based bar code readers or bar code scanners. Imaging systems include charge coupled device (CCD) arrays, complementary metal oxide semiconductor (CMOS) arrays, or other imaging sensor arrays having a plurality of photosensitive elements (photosensors) defining image pixels. An illumination apparatus or system comprising light emitting diodes (LEDs) or other light source directs illumination toward a target object, e.g., a target bar code. Light reflected from the target bar code is focused through a system of one or more lens of the imaging system onto the sensor array. Thus, the target bar code within a field of view (FV) of the imaging lens system is focused on the sensor array.

Periodically, the pixels of the sensor array are sequentially read out generating an analog signal representative of a captured image frame. The analog signal is amplified by a gain factor and the amplified analog signal is digitized by an analog-to-digital converter. Decoding circuitry of the imaging system processes the digitized signals representative of the captured image frame and attempts to decode the imaged bar code.

As mentioned above, imaging-based bar code readers typically employ an imaging lens assembly for focusing scattered/reflected light from the field of view (FV) onto the sensor array. If a target object is within the field of view FV, an image of the target object will be focused onto the sensor array.

There are typically two types of imaging lens assemblies: 1) fixed focus lens systems; and 2) variable focus lens systems. In a fixed focus system, the field of view (FV) and a working range (WR) of the imaging system is fixed. The working range (WR) of an imaging system is a distance range in front of or forward of the imaging lens assembly within which a target object of interest, such as a target bar code, may be successfully imaged and decoded by the imaging system decoding circuitry.

The working range (WR) and field of view (FV) require a user to move the bar code reader relative to the target bar code such that the target bar code is within the field of view (FV) and within the working range (WR) of the imaging system for successful decoding of the imaged target bar code. At the near and far limits of the working range (WR), there is a problem with blurriness, that is, poor resolution of the imaged target bar code. A variable focus lens system addresses the blurriness problem at the limits of the working range (WR) by providing for readjustment/refocusing of the lens system. This readjustment/refocusing of the lens system facilitates obtaining an in-focus image of a target bar code focused onto the sensor array, thus, mitigating blurriness at the limits of the working range (WR).

Known mechanical variable focus lens assemblies depend on mechanical movement of one lens (or more lenses depending on the assembly) of lens assembly with respect to a stationary sensor array. In order to utilize an variable focus lens assembly, it is essential to know a reference position for the moving lens corresponding to a known or reference focal plane position, that is, for a given focal plane position, say reference focal plane position F, it is necessary to know a reference point or position of the moving lens along its path of travel, say lens reference point X. What this means is that when the lens is at reference point X and a target object is positioned at the given or reference focal plane position (say reference focal plane F), an image of the target object will be in-focus on the sensor array, that is, the best resolution image of the target object will be projected onto the sensor array.

It is important to know in advance the location of the reference point and reference focal plane for rapid acquisition of a decodable image of a target object. In some autofocus imaging systems, in order to obtain a decodable image of an encoded target object, the system moves the moving lens from one end stop and continues to iteratively analyze image frames until a decodable image frame is found. If it turns out that the first decodable image frame is somewhere around the middle of the moving lens path of travel, it is easy to see that this type of autofocusing system would, on the average, be slow in acquiring a decodable image of the target object, thus, causing the system to be perceived as sluggish.

By finding a reference point along the path of travel and positioning the moving lens at the reference point for each reading session, instead of having to move the moving lens over an extended portion of the path of travel, the focusing system can quickly move from the reference position to a position where an image of the target may be successfully decoded assuming that the target object is located within the field of view somewhere generally close to the reference focal plane.

Another reason that it is important to be able to establish a precise reference point or position for the moving variable focus lens is because, over time, systemic changes in the moving lens drive system (such as, for example, weakening of bias springs or the wearing down of mechanical surfaces in the case of a mechanical variable focus system) may cause shifting of a previously established reference position for the moving lens. These types of systemic changes in a previously established lens reference position is called a bias error and is of a much more serious nature than differential errors, that is, errors that result in inaccuracies of from moving the lens one position to another along its path of travel. Additionally, variable focus lens assemblies typically do not provide a mechanical stop that could be used as a moving lens reference point because such a mechanical stop along the moving lens path of travel may not be possible or, if possible, may be difficult and costly to implement. Further, while such mechanical stops may provide accurate positions for starting and ending positions along the moving lens path of travel, such mechanical end stops do not provide any feedback to locate the lens in an intermediate position. Locating the lens in an intermediate position facilitates rapid acquisition of an in-focus image of a target object, as discussed above.

In addition to mechanical variable focus lens assemblies discussed above, another type of variable focus lens assembly utilizes a liquid lens. A liquid lens is lens formed by two immiscible liquids of differing conductivity sandwiched between two windows. As an electrical field applied to the liquids is varied, the shape of the interface between the liquids changes and thereby changes the optical characteristics of the liquid lens. Typically, a voltage is applied to the liquid lens, as the applied voltage varies, the optical characteristics change.

Accordingly, in a liquid lens, the "reference point" would be a reference voltage value applied to the liquid lens. The referent point voltage value is the voltage value that corresponds to a reference focal plane. Instead of moving a moving lens along a path of travel to find a reference point along a path of travel of the lens, with respect to a liquid lens, the reference point voltage value is a specific applied voltage value in a range of voltages within an operating range of the liquid lens.

The need to establish a reference point voltage for a reference focal plane is due to the fact that the relationship between the optical power of the liquid lens and the applied voltage depends on temperature and may vary over time. Therefore, it is important to periodically calibrate the image system with respect to a reference focal plane.

What is needed is a method and apparatus for quickly and accurately locating a reference point for a variable focus lens of a variable focus imaging, lens assembly corresponding to a reference focal plane.

SUMMARY

In one aspect, the present invention features a variable focus imaging lens assembly for an imaging system of an imaging-based bar code reader; the imaging system generating image frames of a field of view of the imaging system and including an imaging sensor array. In one exemplary embodiment, the variable focus imaging lens assembly includes:

a lens assembly focusing light from the field of view onto the sensor array, the lens assembly including a lens movable along a path of travel;

a drive mechanism driving the lens along the path of travel;

a focusing system establishing a reference point for the moving lens along the path of travel corresponding to a reference focal plane within the field of view;

a projection assembly projecting a virtual image of a light source to a predetermined position within the field of view and coincident with the reference focal plane, the predetermined position being a known distance from the lens assembly along an optic axis of the lens assembly; and the focusing system energizing the drive mechanism to drive the moving lens along the path of travel, analyzing successive image frames generated by the imaging system to determine an acceptable in-focus resolution of an image of the virtual image of the light source and establishing the moving lens reference point at a position of the moving lens providing the acceptable in-focus resolution of the image of the light source virtual image.

In one embodiment, the moving lens path of travel is coincident with the optical axis of the lens assembly, in an exemplary embodiment, the projection assembly includes an optic element comprising an exit window of the bar code reader. In one embodiment, the projection assembly includes at least one light source positioned outside of the field of view.

In one aspect, the present invention features an imaging-based bar code reader. In one exemplary embodiment, the bar code reader includes:

an imaging system generating image frames of a field of view of the imaging system and including an imaging sensor array; and a variable focus imaging lens assembly for focusing light from the field of view onto the sensor array, the variable focus imaging lens assembly including:

a lens assembly focusing light from the field of view onto the sensor array, the lens assembly including a lens movable along a path of travel;

a drive mechanism driving the lens along the path of travel;

a focusing system establishing a reference point for the moving lens along the path of travel corresponding to a reference focal plane within the field of view;

a projection assembly positioned outside of the field of view and projecting a virtual image of a light source to a predetermined position within the field of view and coincident with the reference focal plane, the predetermined position being a known distance from the lens assembly along an optic axis of the lens assembly; and the focusing system energizing the drive mechanism to drive the moving lens along the path of travel, analyzing successive image frames generated by the imaging system to determine an acceptable in-focus resolution of an image of the virtual image of the light source and establishing the moving lens reference point at a position of the moving lens providing the acceptable in-focus resolution of the image of the light source virtual image.

In one embodiment, the moving lens path of travel is coincident with the optical axis of the lens assembly. In an exemplary embodiment, the projection assembly includes an optic element comprising an exit window of the bar code reader. In one embodiment, the projection assembly includes at least one light source positioned outside of the field of view.

In one aspect, the present invention features a variable focus imaging lens assembly for an imaging system of an imaging-based bar code reader, the imaging system generating image frames of a field of view of the imaging system and including an imaging sensor array. In one exemplary embodiment, the variable focus imaging lens assembly includes:

a lens assembly focusing light from the field of view onto the sensor array, the lens assembly including a liquid lens whose optical characteristics vary with a voltage applied to the liquid lens;

a variable voltage source for applying a voltage to the liquid lens;

a focusing system establishing a reference voltage for the liquid lens corresponding to a reference focal plane within the field of view;

a projection assembly projecting a virtual image of a light source to a predetermined position within the field of view and coincident with the reference focal plane, the predetermined position being a known distance from the lens assembly along an optic axis of the lens assembly; and the focusing system energizing the variable voltage source to vary the voltage applied, to the liquid lens, analyzing successive image frames generated by the imaging system to determine an acceptable in-focus resolution of an image of the virtual image of the light source and establishing the voltage reference point at a voltage applied to the liquid lens providing the acceptable in-focus resolution of the image of the light source virtual image.

In an exemplary embodiment, the projection assembly includes an optic element comprising an exit window of the bar code reader, in one embodiment, the projection assembly includes at least one light source positioned outside of the field of view.

In one aspect, the present invention features an imaging-based bar code reader. In one exemplary embodiment, the bar code reader includes:

an imaging system generating image frames of a field of view of the imaging system and including an imaging sensor array; and a variable focus imaging lens assembly for focusing light from the field of view onto the sensor array, the variable focus imaging lens assembly including:

a lens assembly focusing light from the field of view onto the sensor array, the lens assembly including a liquid lens whose optical characteristics vary with a voltage applied to the liquid lens;

a variable voltage source for applying a voltage to the liquid lens;

a focusing system establishing a reference voltage for the liquid lens corresponding to a reference focal plane within the field of view;

a projection assembly projecting a virtual image of a light source to a predetermined position within the field of view and coincident with the reference focal plane, the predetermined position being a known distance from the lens assembly along an optic axis of the lens assembly; and the focusing system energizing the variable voltage source to vary the voltage applied to the liquid lens, analyzing successive image frames generated by the imaging system to determine an acceptable in-focus resolution of an image of the virtual image of the light source and establishing the voltage reference point at a voltage applied to the liquid lens providing the acceptable in-focus resolution of the image of the light source virtual image.

In an exemplary embodiment, the projection assembly includes an optic element comprising an exit window of the bar code reader. In one embodiment, the projection assembly includes at least one light source positioned outside of the field of view.

These and other objects, advantages, and features of the exemplary embodiments are described in detail in conjunction with the accompanying drawings.

BRIEF DESCRIPTION OF THE DRAWINGS

The foregoing and other features and advantages of the present invention will become apparent to one skilled in the art to which the present invention relates upon consideration of the following description of the invention with reference to the accompanying drawings, in which.

DETAILED DESCRIPTION

Figure 1:
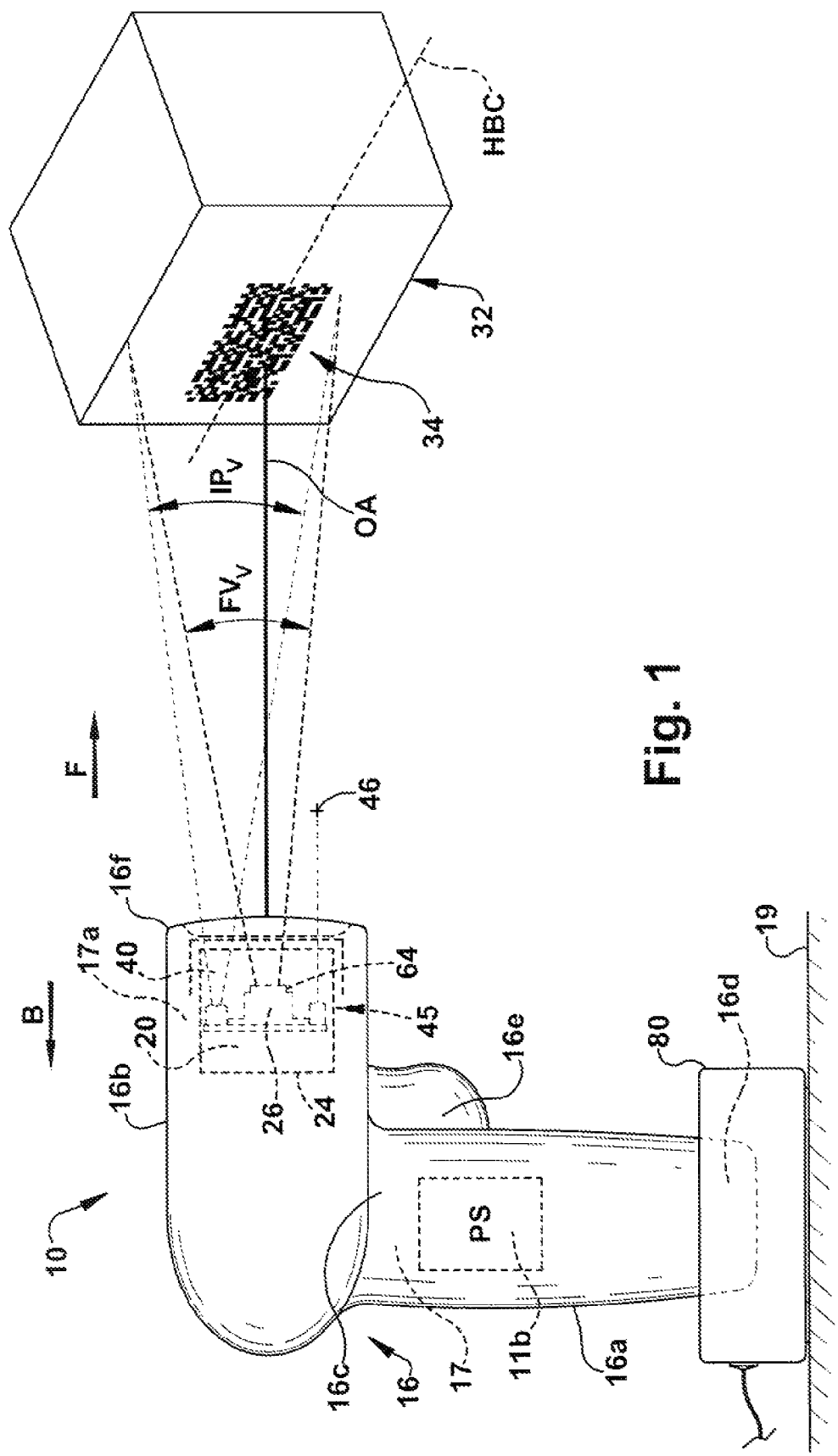
FIG. 1 is a schematic side elevation view of an exemplary embodiment of an imaging-based bar code reader of the present invention.
Figure 2:
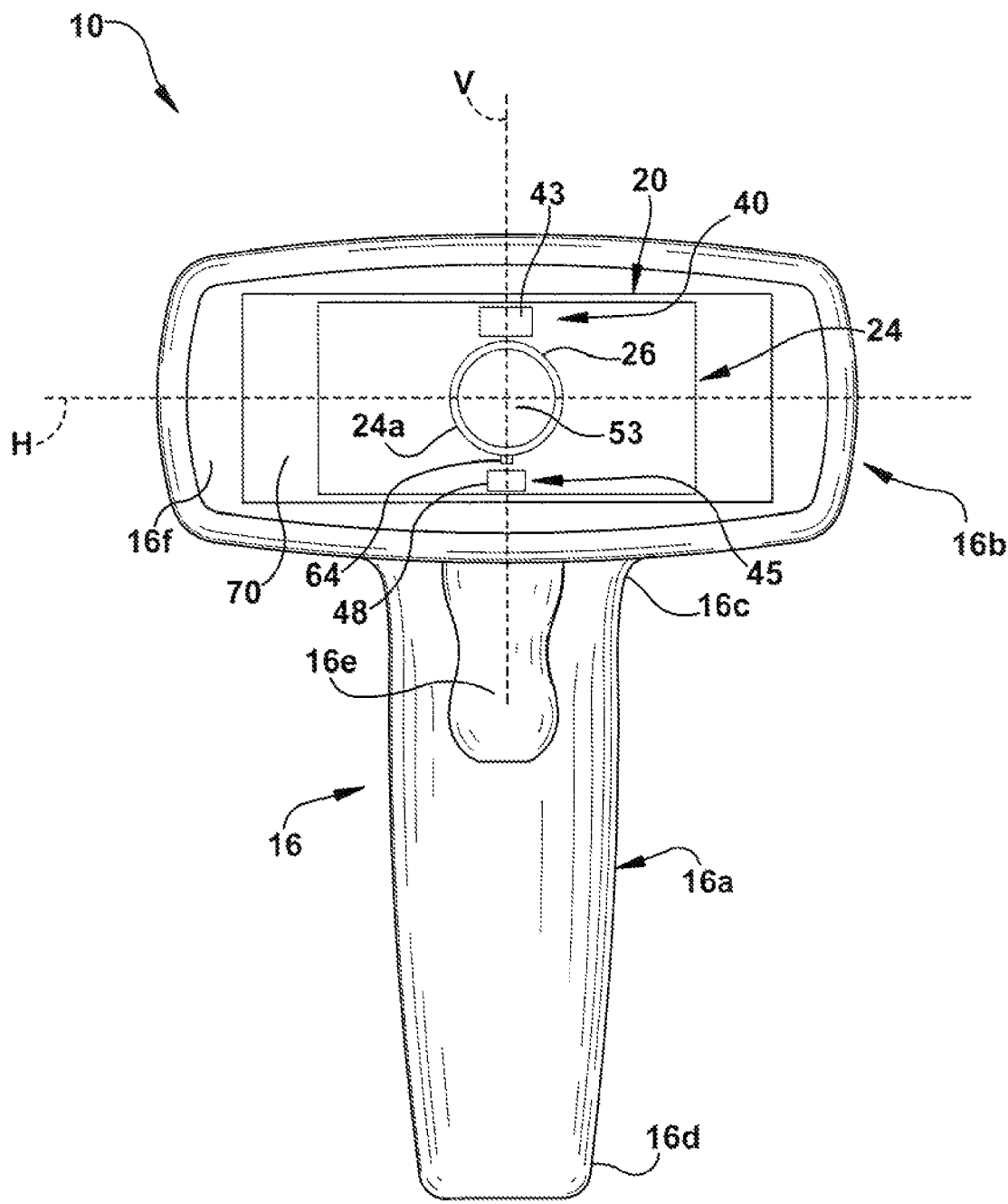
FIG. 2 is a schematic front elevation view of the bar code reader of FIG. 1.

A first exemplary embodiment of an imaging-based bar code reader of the present invention is shown schematically at 10 in FIGS. 1-6. The bar code reader 10 includes an imaging system 12 and a decoding system 14 mounted in a housing 16. The reader 10 is capable of reading, that is, imaging and decoding bar codes. The imaging system 12 is adapted to capture image frames of a field of view FV of the imaging system 12 and the decoding system 14 is adapted to decode encoded indicia within a captured image frame. The housing 16 supports circuitry 11 of the reader 10 including the imaging and decoding systems 12, 14 within an interior region 17 of the housing 16.

The imaging system 12 comprises a modular scan engine or imaging camera assembly 20 and associated imaging circuitry 22. The camera assembly 20 may, but does not have to be, modular in that the housing 24 may be removed or inserted as a unit into the reader 10, allowing the ready substitution of camera assemblies having different imaging characteristics, e.g., camera assemblies having different working ranges and different fields of view. A working range WR is a distance range in front of or forward (in a direction F in FIG. 1) of the camera assembly 20 within which a target object of interest 32, such as a target bar code 34, may be successfully imaged and decoded.

The imaging camera assembly 20 includes a housing 24 supporting a variable focus imaging lens assembly or system 50. The variable focus imaging lens assembly 50 includes a lens assembly 52 having one or more imaging lens, which define an optical axis OA and focus illumination from the field of view FV onto a sensor array 28. At least one lens 53 of the lens assembly moves along a path of travel PT. Advantageously, this provides for decreasing image blurriness at the near and far limits of the working range WR of the camera assembly 20.

The sensor array 28 is enabled during an exposure period to capture an image of a target object 32, such as a target bar code 34, within a field of view FV of the imaging system 12. The field of view FV of the imaging system 12 is a function of both the configuration of the sensor array 28 and the lens assembly 52 and the distance and orientation between the array 28 and the lens assembly 52.

In one exemplary embodiment, the imaging system 12 is a two dimensional (2D) imaging system and the sensor array 28 is a 2D sensor array. It should be understood, however, that the present invention is equally applicable to a linear or one dimensional imaging system having a 1D linear sensor array.

Figure 3:
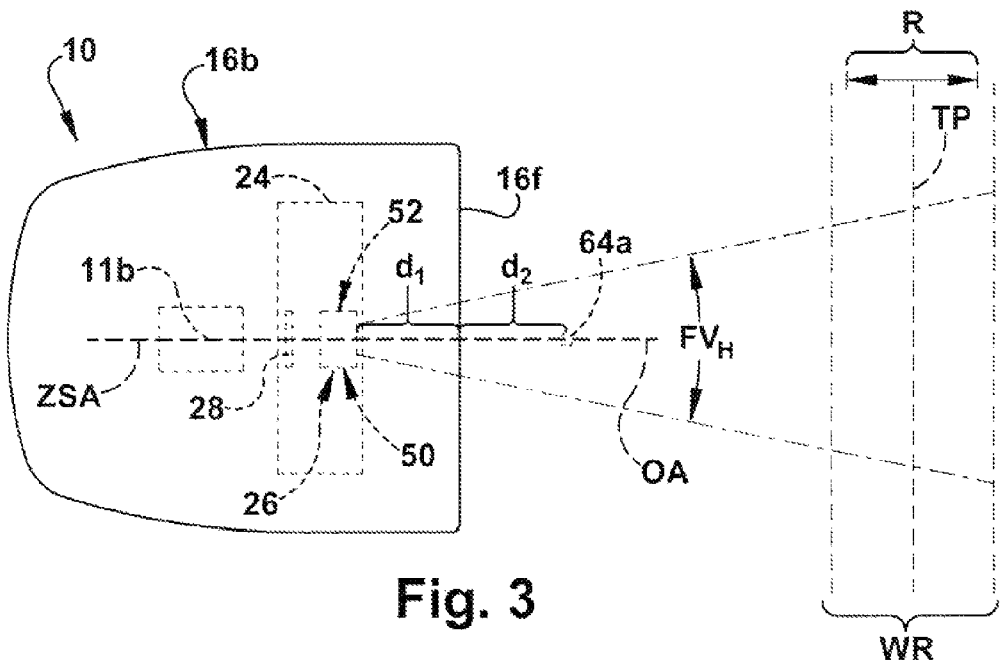
FIG. 3 is a schematic top plan view of the bar code reader of FIG. 1.
Figure 4:
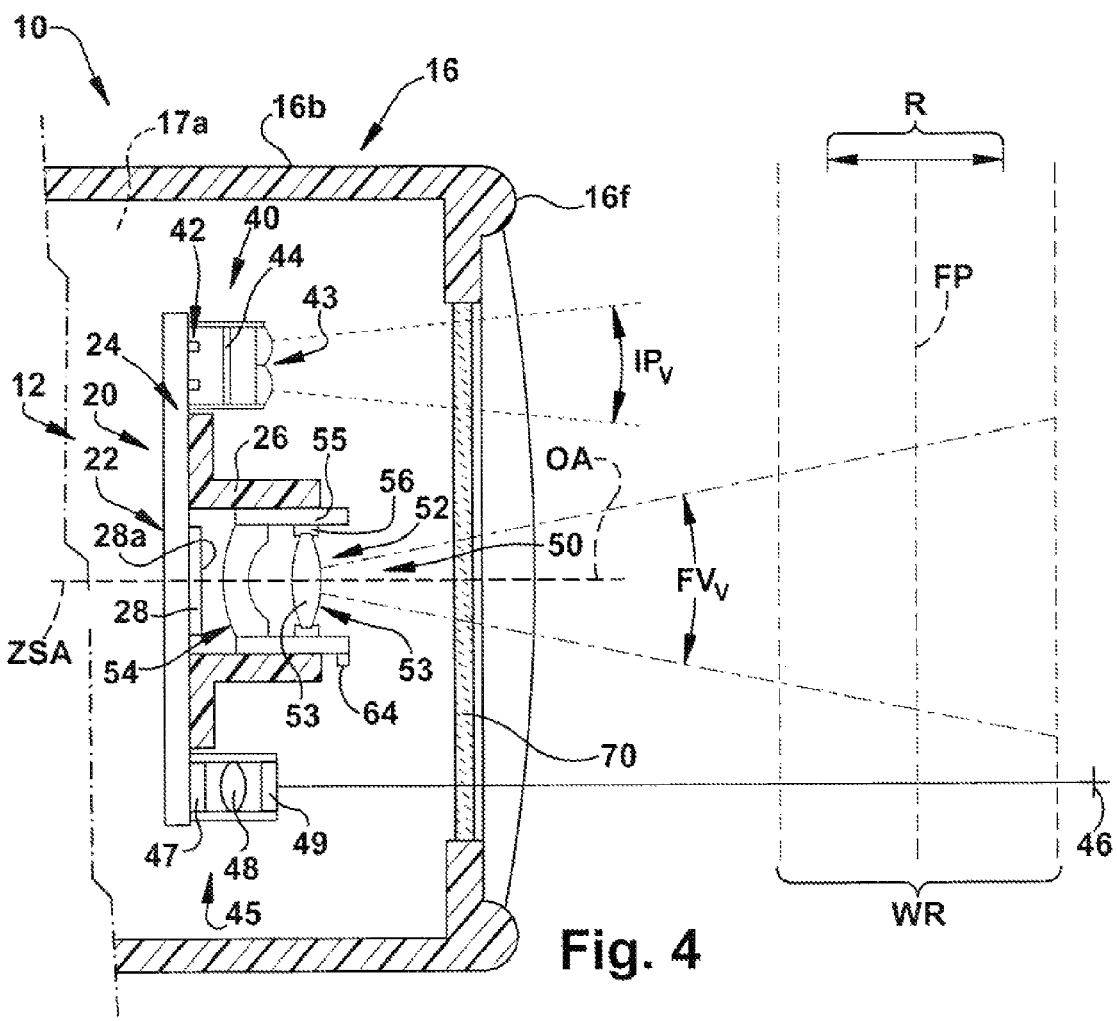
FIG. 4 is a schematic view partly in section and partly in side elevation of a camera assembly of an imaging assembly of the bar code reader of FIG. 1.

The imaging system 12 field of view FV (shown schematically in FIG. 5) includes both a horizontal and a vertical field of view, the horizontal field of view being shown schematically as FVH in FIG. 3 and the vertical field of view being shown schematically as FVV in FIGS. 1 and 4. The sensor array 28 is primarily adapted to image 1D and 2D bar codes, for example, a Data Matrix bar code as shown in FIG. 1 which extends along a horizontal axis HBC and includes multiple rows of indicia comprising a multi-row, multi-column array of dark bars and white spaces. However, one of skill in the art would recognize that the present invention is also applicable to image postal codes, signatures, etc.

The housing 16 includes a gripping portion 16a adapted to be grasped by an operator's hand and a forward or scanning head portion 16b extending from an upper part 16c of the gripping portion 16a. A lower part 16d of the gripping portion 16a is adapted to be received in a docking station 30 positioned on a substrate 19 such as a table or sales counter. The scanning head 16b supports the imaging system 12 within an interior region 17a (FIG. 4) of the scanning head 16b. As can best be seen in FIG. 2, looking from the front of the housing 16, the scanning head 16b is generally rectangular in shape and defines a horizontal axis H and a vertical axis V. The vertical axis V being aligned with a general extent of the gripping portion 16a.

Advantageously, the reader 10 of the present invention is adapted to be used in both a hand-held mode and a fixed position mode. In the fixed position mode, the housing 16 is received in the docking station 30 and a target object 32 having a target bar code 34 (FIG. 1) is brought within the field of view FV of the reader's imaging system 12 in order to have the reader 10 read the target bar code 34. The imaging system 12 is typically always on or operational in the fixed position mode to image and decode any target bar code presented to the reader 10 within the field of view FV. The docking station 30 is plugged into an AC power source and provides regulated DC power to circuitry 11 of the reader 10. Thus, when the reader 10 is in the docking station 30 power is available to keep the imaging system 12 on continuously.

In the hand-held mode, the housing 14 is removed from the docking station 30 so the reader 10 can be carried by an operator or user and positioned such that the target bar code 34 is within the field of view FV of the imaging system 12. In the hand-held mode, imaging and decoding of the target bar code 34 is instituted by the operator depressing a trigger 16e extending through an opening near the upper part 16c of the gripping portion 16a.

Figure 5:
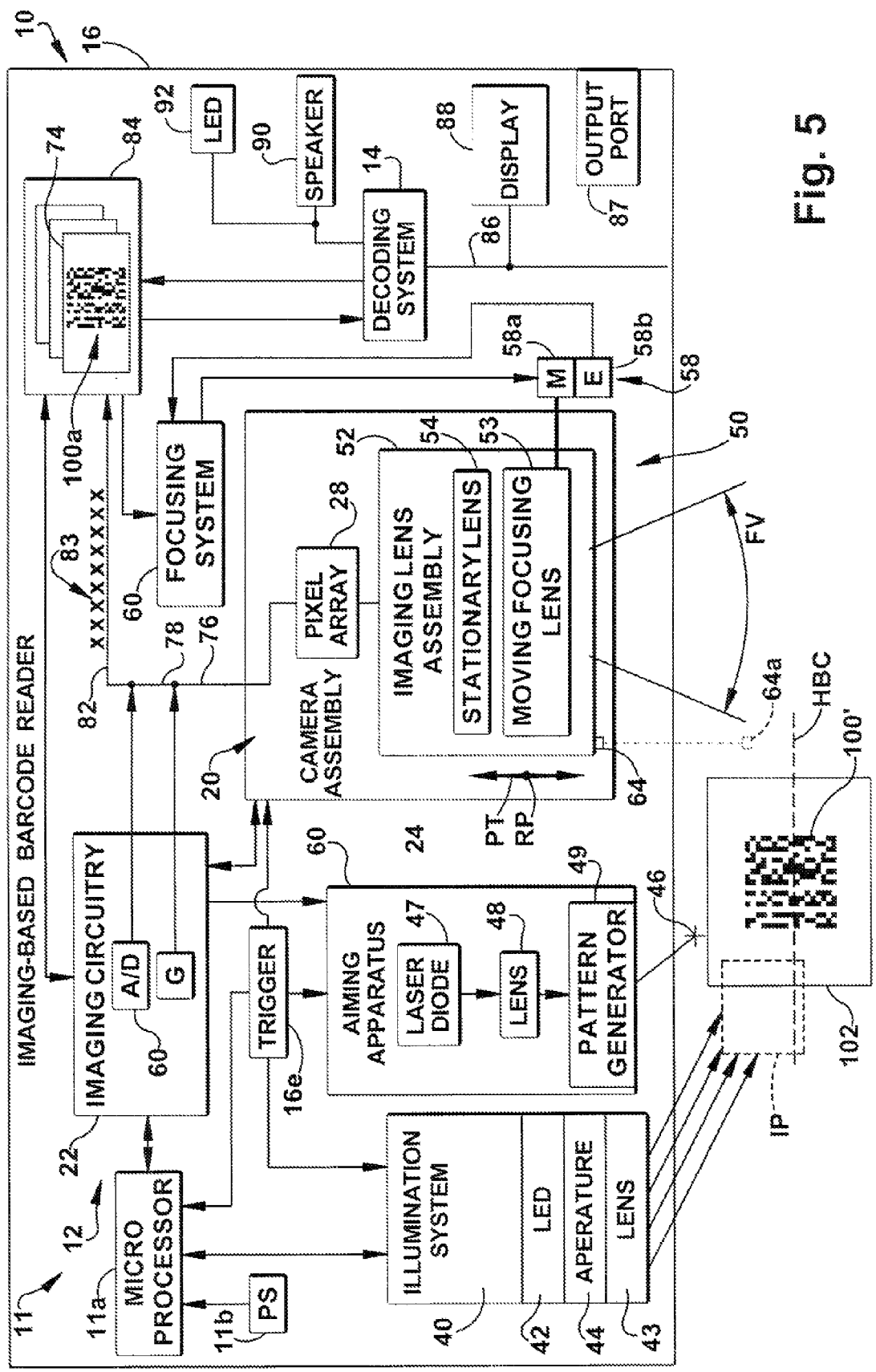
FIG. 5 is a schematic block diagram of the bar code reader of FIG. 1.

The imaging system 12 is part of the bar code reader circuitry 11 which operates under the control of a microprocessor 11a (FIG. 5). When removed from the docking station 30, power is supplied to the imaging and decoding systems 12, 14 by a power supply 11b. The imaging and decoding systems 12, 14 of the present invention may be embodied in hardware, software, electrical circuitry, firmware embedded within the microprocessor 11a or the modular camera assembly 20, on flash read only memory (ROM), on an application specific integrated circuit (ASIC), or any combination thereof.

Illumination Apparatus 40 and Aiming System 45

The bar code reader 10 includes an illumination apparatus or system 40 to illuminate the field of view FV, including the target bar code 34, and a laser aiming system 45 which generates a visible crosshair aiming pattern 46 (FIGS. 1, 4 and 5) to aid the operator in aiming the reader 10 at the target bar code 34 when using the reader 10 in the hand-held mode.

The aiming system 45 generates the visible aiming pattern 46 comprising, as an example, a dot or a crosshair pattern of illumination. The aiming system 45 typically includes a laser diode 47, a focusing lens 48 and a pattern generator 49 for generating the desired aiming pattern 46. The aiming pattern 46 is disabled when the imaging system 12 images the target bar code 34 to avoid have the aiming pattern appear in the captured image frames 74 and compromise the quality of the imaged target bar code 34a.

The illumination apparatus 40 may include one or more illumination sources 42 (FIGS. 4 and 5) such as surface mount LEDs (or a cold cathode lamp (CFL) which is energized to direct illumination though a focusing lens 43 and generate an illumination pattern IP (shown schematically in FIG. 5) that fills or substantially coincides with the field of view FV of the imaging system 12. An aperture 44 defining an opening is positioned between the LED 42 and a focusing lens 43. The aperture 44 limits the light or illumination from the LED focused onto the focusing lens 43. The focusing lens 43 images or projects the general shape of the aperture 44 toward the target object 32 thus defining the illumination pattern IP. The aperture 44 is in proximity to a focal plane of the focusing lens 43. The light from the aperture opening is collected and focused by the focusing lens 43.

The horizontal and vertical size or dimensions of the aperture 44 determine the horizontal and vertical extents (IPH & IPV) of the illumination pattern IP projected on the target object 32. While the illumination assembly 40 shown in the exemplary embodiment of the reader 10 includes a pair of illumination sources 42, an aperture 44 and a focusing lens 43, it should be understood that depending on the specifics of the reader and the environmental conditions under which the reader will be used, an illumination assembly 40 may be utilized having a single illumination source, such as an LED, without an aperture or a focusing lens.

The imaging circuitry 22 may be disposed within, partially within, or external to the camera assembly housing 24. A back end of the housing 24 may be comprised of a printed circuit board 24b, which forms part of the imaging circuitry 22 and extends vertically to also support the illumination source 42 (best seen in FIG. 4).

Figure 6:
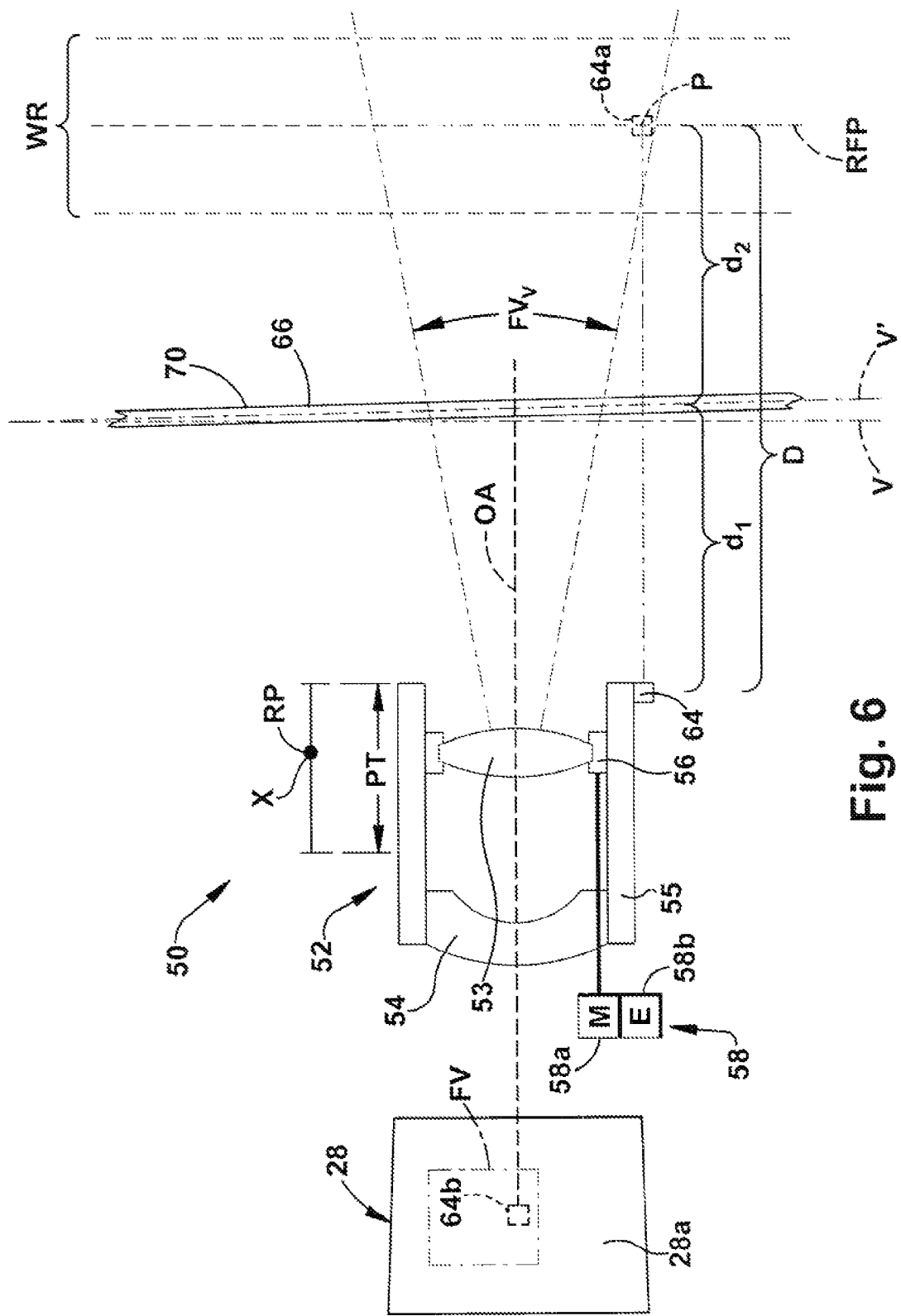
FIG. 6 is a schematic side elevation view of a first exemplary embodiment of a variable focus imaging lens system and focusing system of the present invention.

The camera housing 24 is supported within the scanning head interior region 17a in proximity to a transparent window 70 (FIG. 4) defining a portion of a front wall 16f of the scanning head 16b. The window 70 is oriented such that its horizontal axis is substantially parallel to the scanning head horizontal axis H. The vertical axis of the window 70 is tilted slightly to V' (FIG. 6) from the vertical axis V to avoid specula reflection. Specula reflection would occurs if, for example, a virtual image of the illuminated focusing lens 43 of the illumination assembly 40 were to be projected by the exit window 70 within the field of view FV of the imaging system 12. As can be seen in FIG. 6, the axis V' of the window 70 deviates at a very slight angle from the vertical axis V.

Recall that the illumination apparatus 40 is positioned behind the window 70, thus, illumination from the illumination apparatus 40 passes through the window 70. If the window 70 is not tilted appropriately, depending on the position of the focusing lens 43, a virtual image or projection of the illuminated focusing lens 43 may be projected by the window 70, acting as an optic element with an optic power of one (no magnification), into the camera assembly field of view FV. If a virtual projection of the illuminated focusing lens 43 were to be projected into the field of view, an image of the field of view FV projected onto the sensor array 28 would include an image of the virtual projection of the focusing lens 43, possibly distorting the imaged bar code 34*a* in the image frames 74 and making the imaged bar code 34*a* undecodable.

Sensor Array 28

The imaging system 12 includes the sensor array 28 of the imaging camera assembly 20. The sensor array 28 comprises a charged coupled device (CCD), a complementary metal oxide semiconductor (CMOS), or other imaging pixel array, operating under the control of the imaging circuitry 22. In one exemplary embodiment, the sensor array 28 comprises a two dimensional (2D) mega pixel CMOS array with a typical size of the pixel array being on the order of 1280×1024 pixels. Each pixel is comprised of a photosensitive element or photosensor that receives light and stores a charge proportional to the intensity of the light received and then is periodically discharged to generate an electrical signal whose magnitude is representative of the charge on the photosensitive element during an exposure period.

The illumination-receiving pixels of the sensor array 28 define a light receiving sensor array surface 28*a* (best seen in FIG. 4). The sensor array 28 is secured to the printed circuit board 24*b*, in parallel direction for stability. The sensor array surface 28*a* is substantially perpendicular to the optical axis OA of the lens assembly 52, that is, a z axis (labeled ZSA in FIG. 4) that is perpendicular to the sensor array surface 28*a* would be substantially parallel to the optical axis OA of the lens assembly 52. The pixels of the sensor array surface 28*a* are disposed substantially parallel to the horizontal axis H of the scanning head 16*b*.

As is best seen in FIG. 4, the lens assembly 52 focuses light reflected and scattered from the target bar code 34 onto the sensor array surface 28*a* of the sensor array 28. Thus, the lens assembly 52 focuses an image 34*a* of the target bar code 34 (assuming it is within the field of view FV) onto the array of pixels comprising the sensor array 28.

Operation of Imaging and Decoding Systems 12, 14

When actuated to read the target bar code 34, the imaging system 12 captures a series of image frames 74 (FIG. 5) which are stored in a memory 84. Each image frame 74 includes the image 34*a* of the target bar code 34 (shown schematically in FIG. 5). The decoding system 14 decodes a digitized version of the image bar code 34*a*.

Electrical signals are generated by reading out of some or all of the pixels of the sensor array 28 after an exposure period. After the exposure time has elapsed, some or all of the pixels of sensor array 28 are successively read out thereby generating an analog signal 76 (FIG. 4). In some sensors, particularly CMOS sensors, all pixels of the sensor array 28 are not exposed at the same time, thus, reading out of some pixels may coincide in time with an exposure period for some other pixels.

The analog image signal 76 represents a sequence of photosensor voltage values, the magnitude of each value representing an intensity of the reflected light received by a photosensor/pixel during an exposure period. The analog signal 76 is amplified by a gain factor, generating an amplified analog signal 78. The imaging circuitry 22 further includes an analog-to-digital (A/D) converter 80. The amplified analog signal 78 is digitized by the A/D converter 80 generating a digitized signal 82. The digitized signal 82 comprises a sequence of digital gray scale values 83 typically ranging from 0-255 (for an eight bit processor, i.e., $2^8$=256), where a 0 gray scale value would represent an absence of any reflected light received by a pixel during an exposure or integration period (characterized as low pixel brightness) and a 255 gray scale value would represent a very high intensity of reflected light received by a pixel during an exposure period (characterized as high pixel brightness).

The digitized gray scale values 83 of the digitized signal 82 are stored in the memory 84. The digital values 83 corresponding to a read out of the sensor array 28 constitute the image frame 74, which is representative of the image projected by the focusing lens 26 onto the sensor array 28 during an exposure period. If the field of view FV of the imaging lens assembly 26 includes the target bar code 34, then a digital gray scale value image 34*a* of the target bar code 34 would be present in the image frame 74.

The decoding circuitry 14 then operates on the digitized gray scale values 83 of the image frame 74 and attempts to decode any decodable image within the image frame, e.g., the imaged target bar code 34*a*. If the decoding is successful, decoded data 86, representative of the data/information coded in the bar code 34 is then output via a data output port 87 and/or displayed to a user of the reader 10 via a display 88. Upon achieving a good "read" of the bar code 34, that is, the imaged bar code 34*a* was successfully imaged and decoded, a speaker 90 and/or an indicator LED 92 is activated by the bar code reader circuitry 13 to indicate to the user that the target bar code 34 has successfully read, that is, the target bar code 34 has been successfully imaged and the imaged bar code 34*a* has been successfully decoded. If decoding is unsuccessful, a successive image frame 74 is selected and the decoding process is repeated until a successful decode is achieved.

Variable Focus imaging Lens Assembly 50

As mentioned above, the variable focus imaging lens assembly or system 50 includes the lens assembly 50 and a focusing system 60. The lens assembly 52 focuses light reflected and scattered from the object of interest such as the target bar code 34 onto the sensor array surface 28*a*, thereby focusing an image 34*a* of the target bar code 34 (assuming it is within the field of view FV) onto the sensor array surface 28*a*. The focusing system 60 analyzes the series of image frames 74 generated by the imaging system 12 and causes the drive mechanism 58 to move the moving lens 53 obtain the most in-focus image 34*a* of the target bar code 34 on the sensor array 34.

The imaging lens assembly 52 includes at least one lens 53 (FIGS. 4 and 6) which is movable along a path of travel PT with respect to the sensor array 28 and may include one or more stationary lenses 54 which are stationary with respect to the sensor array 28. The path of travel PT of the moving lens is substantially parallel to and congruent with the optical axis OA of the lens assembly 52. It should be understood that the moving lens 53 may comprise a single lens, as shown schematically in the drawings or, depending on desired optical characteristics, may include a plurality of optical elements including lenses and/or apertures, all of which move together. It should also be understood that the imaging lens assembly 52 may be comprised solely of a moving lens assembly 53, that is, one or more of optical elements, all of which move together, without the use of any stationary lenses.

If a set of stationary lenses 54 is utilized, the set of stationary lenses 54 may comprise a single lens or a plurality of lenses, one or more aperture stops, etc. A typical set of stationary lenses is disclosed in U.S. application Ser. No. 11/731,835, filed Mar. 30, 2007 and entitled "Compact Imaging Lens Assembly for an Imaging-Based Bar Code Reader," The '835 application is assigned to the assignee of the present invention and is incorporated herein in its entirety by reference.

The variable focus imaging lens assembly 50 also includes the focusing system 60 which controls the movement of the moving lens 53 and a projection assembly 62 that is used for calibration purposes, as will be explained below. The focusing system 60 may be part of the imaging system circuitry 22 or it may be embodied in separate circuitry/software that is separate from but electrically coupled to the imaging system circuitry 22, the microprocessor 11a and the memory 84. The focusing system 60 also controls operation of the projection assembly 62.

The lens assembly 52 is supported by a pair of lens holders 55, 56. The stationary lenses 54 is supported by the lens holder 55 which is stationary with respect to the sensor array 28. The moving lens 53 is supported by the lens holder 56. In one exemplary embodiment, the moving lens holder 56 is movably supported within the stationary lens holder 55 and moves forward F and backward B along the optical axis OA with respect to the stationary lens holder 55. Thus, when the moving lens holder 56 slides or telescopes within the stationary lens holder 55, the moving lens 53 moves along its path of travel PT. The camera housing 24 defines a shroud 26 that supports and seals against the stationary lens holder 55 so that the only light incident upon the sensor array 28 is illumination passing through the lens assembly 52. The lens holders 55, 56 are typically made of metal or plastic material. It should be understood that other configurations of lens holders 55, 56 are possible beside the relationship mentioned above, for example, it would be possible to have a single lens holder 55 with the moving lens 53 held in a small support 56 that moves along a track within the single lens holder 55. This option is shown schematically in FIGS. 6-8. Other possibilities for supporting the moving lens would be apparent to one of skill in the art.

The moving lens 53 is moved along the path of travel PT under the control of the focusing system 60 by a drive mechanism 58. The drive mechanism 58 includes a motor 58a, such as a servo motor, to accurately drive the moving lens holder 56 such that the moving lens 53 moves along its path of travel PT and a position encoder 58b to accurately read out the position of the lens 53 as it moves along its path of travel PT.

Additional details of an automatic focusing system suitable for an imaging-based bar code reader are disclosed in U.S. Ser. No. 10/903,792, filed Jul. 30, 2004 and entitled "Automatic Focusing System for Imaging-Based Bar Code Reader." The '792 application is assigned to the assignee of the present invention and is incorporated herein in its entirety by reference.

Advantageously, compared to a imaging system having a fixed imaging lens assembly, the variable focus imaging lens assembly 50 permits the imaging system 12 to have an extended depth of field or working range WR (shown schematically in FIGS. 3 and 4) over which a target object with encoded indicia, such as target bar code 34, can be successfully imaged and decoded because the assembly 50 provides for less image blurriness at the near and far limits of the working range WR. The focal plane FP (shown schematically in FIGS. 3 and 4) of the lens assembly 52 varies with the position of the moving lens 53 along its path of travel. The focal plane FP is a plane within the field of view FV at which the best in-focus image 34a of the target bar code 34 would be focused by the imaging lens assembly 26 onto the sensor array 28. Stated another way, if the target bar code 34 were positioned at the focal plane FP, a very sharp, high resolution image 34a of the target bar code 34 would be projected onto the sensor array 28.

As can be seen schematically in FIGS. 3 and 4, the focal plane FP varies over a range R as the moving lens 53 is moved along its path of travel PT. The working range WR of the imaging system 12 extends beyond the focal plane range R because even at distances which are closer to the camera assembly 20 or further from the camera assembly 20 than the focal plane range R, the image 34a of the target bar code 34 may be focused onto the sensor array 28 with sufficient resolution to allow decoding by the decoding system 14 even through the target object is not aligned with the focal plane FP. Stated another way, the working range WR allows decodable images to be captured from the target bar code 34 in a distance range about or surrounding the focal plane FP. As is seen in FIGS. 3 and 4 the working range WR envelopes the focal plane range R. Of course, the working range WR is, among other things, dependent on the size and density of the target bar code 34, sensor resolution, etc.

Calibration of the Variable Focus Imaging Lens Assembly 50

To facilitate rapid acquisition of images and to efficiently mitigate systematic error of the variable focus imaging lens assembly or system 50 over its life cycle, it is necessary to periodically calibrate the lens assembly 52. Such calibration may be done any desired interval, for example, at the start of each bar code reading session, when the reader is first powered up at the beginning of the day, or at some longer interval. Specifically, for a given or reference focal plane RFP within the field of view FV of the imaging system, it is necessary that the focusing system 60 be able to establish a reference point or position RP for the moving lens 53 along its path of travel PT. The reference focal plane RFP is a plane that is orthogonal to the optical axis OA of the lens assembly 52 and is at a predetermined distance D from the lens assembly 52.

A reference point or position RP of the moving lens 53 corresponds to the reference focal plane RFP. This means that if the target bar code 34 is positioned within the field of view FV at the reference focal plane RFP, the lens assembly 52 would focus the imaged bar code 34a onto the sensor array 28 with sufficient sharpness and resolution such that the imaged bar code 34a would be acceptable or suitable for decoding. Such a sharply resolved image of the target bar code 34 is referred to as an acceptable resolution of the imaged bar code 34a.

As noted above, the variable focus imaging lens assembly 50 includes the projection assembly 62 which operates under the control of the focusing system 60. The projection assembly 62 includes a reference light source 64, positioned outside of the field of view FV, and at least one optic element 66 which generates a virtual target image or projection 64a of the light source 64 within the field of view FV of the imaging system 12. The reference light source 64 is located outside, the field of view FV to avoid "hot spots" in the captured image frames. In a first embodiment shown schematically in FIG. 6, the light source 64 is an LED positioned just outside of the stationary lens holder 55. The optic element 66 of the projection assembly 62 in this embodiment comprises the window 70. The window 70, which is in the field of view FV, can be viewed as an optic element with an optic power of one with a focal length of substantially infinity.

As mentioned previously, the window 70 is tilted from vertical axis V (along axis V' in FIG. 6) to avoid specula reflection of the illumination system 40 in the field of view FV. Depending on the position of the light source 64, it may or may not be necessary to have a vertical tilt of the window 70 to avoid specula reflection. The window 70 functions as optic element 66 and projects a virtual target projection or image 64a of the light source 64 into the field of view FV at a predetermined position P. The virtual target image 64a is projected at a distance D from the lens assembly 52 when measured along the optical axis OA of the lens assembly 52, that is, when measured along an axis that is parallel to the optical axis of the lens assembly 52.

Figure 10:
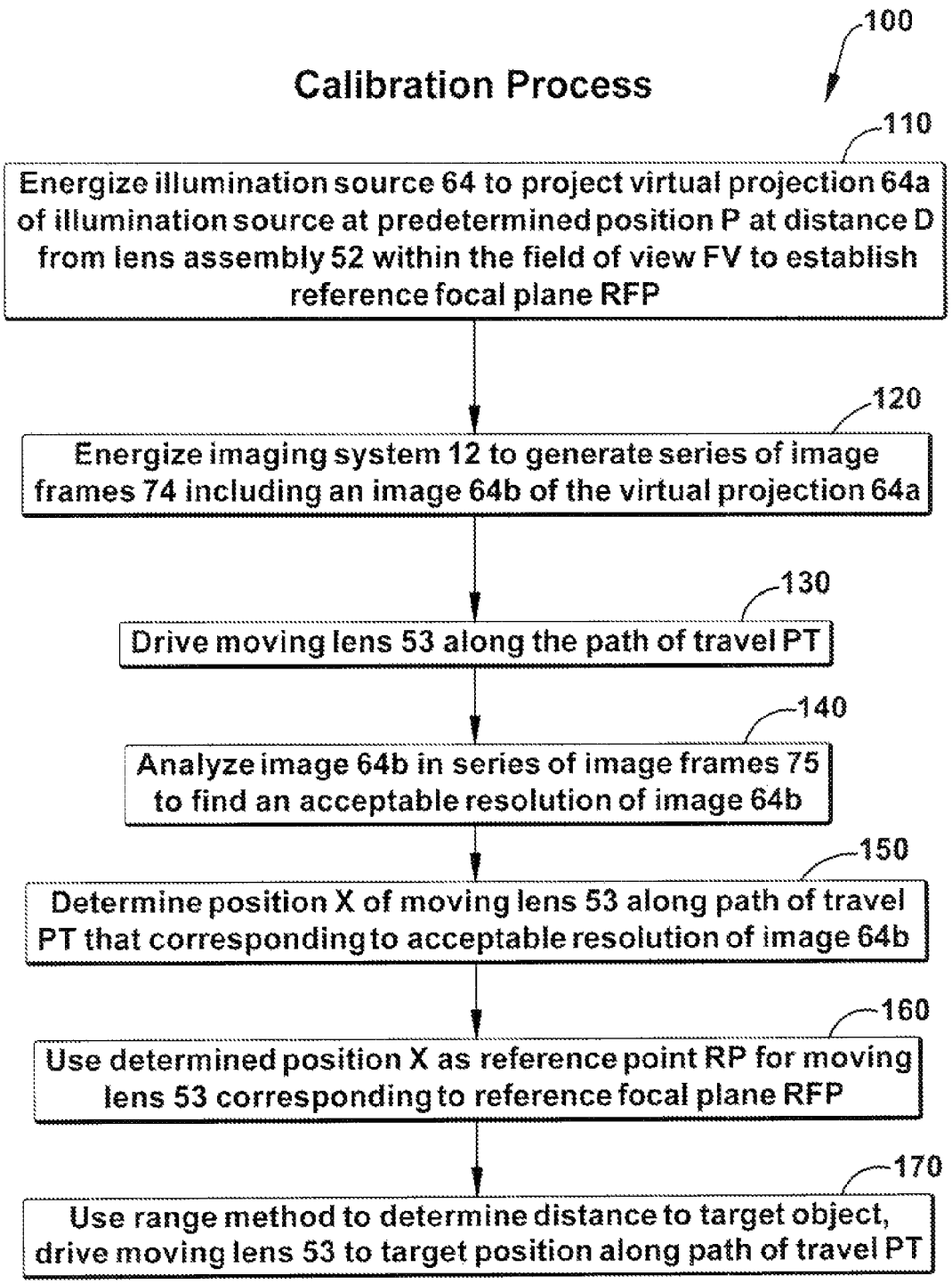
FIG. 10 is a schematic flow diagram of a calibration process of the present invention executed by the focusing system.

A schematic flow diagram for the calibration process 100 undertaken by the focusing system 60 is shown in FIG. 10. The steps of the calibration process include the following:

At step 110, energize the light source 64 to project the virtual target projection or image 64a of the light source 64 at a predetermined position P at distance D from lens assembly 52 within the field of view FV to establish reference focal plane RFP. At step 120, energize imaging system 12 to generate series of image frames 74 each including an image 64b of the virtual target image 64a.

At step 130, drive moving lens 53 along the path of travel PT. At step 140, analyze the image 64b found in each of the series of image frames 75 to find an acceptable or suitable resolution of image 64b. At step 150, determine a position X of moving lens 53 along path of travel PT corresponding to an acceptable resolution of image 64b. At step 160, the determined position X is the reference point RP for the moving lens 53. The reference point RP along the path of travel PT of moving lens 53 corresponds to the reference focal plane RFP. After calibration is complete, the reference light source 64 is turned off.

Since the window 70 is essentially a flat optic with minimal tilt, by simple geometry, if the distance between the light source 64 and the window 70 is d1, then a distance between the window and the virtual target image 64a of the light source 64 is d2 wherein d1=d2. If the light source 64 is positioned substantially at an end of the lens assembly 52 (or the moving lens holder 56), then the effective total distance D from the lens assembly 52 to the virtual target image 64a would be substantially D=d1+d2 when that distance D is measured along the optical axis OA. The virtual target image 64a of the light source 64 establishes an image point on what can be considered the reference focal plane RFP (orthogonal to the optic axis OA) for purposes of calibration of the moving lens 53.

With the light source 64 and imaging system 12 both energized, the focusing system 60 moves the moving lens 53 along its path of travel PT. An image 64b (schematically shown in FIG. 6) of the virtual target image 64a is projected onto the sensor array surface 28a by the lens assembly 52. In FIG. 6, the sensor array 28 is schematically represented at an angle to illustrate the field of view FV and the image 64b within the field of view FV projected onto the sensor array surface 28a by the lens assembly 52.

The focusing system 60 analyzes successive image frames 74 to find a position of the moving lens 53 that generates an image frame having an acceptable or suitable in-focus image of the virtual target image 64a. An acceptable or suitable in-focus image of the virtual target image 64a means that of the image frames analyzed by the focusing system 60, the "acceptable" frame is the frame that has the sharpest or best resolution of the virtual target image 64a of those series frames 74 analyzed as the moving lens 53 traverses its path of travel PT.

The reference point or position RP is determined by the focusing system 60 to be the point or position of the moving lens 53 that corresponds to the image frame 74 having the acceptable in-focus image 64b of the virtual target image 64a. The term "acceptable in-focus image" is used because it is recognized that depending on the exposure period of image frames 74 and the timing between captured image frames 74, a position of the moving lens 53 that generates the true optimal resolution of the image 64b of the virtual image 64a may be a position along the path of travel PT that is intermediate to the positions corresponding to two successive image frames. It is also recognized that the resolution of the image 64b found in two or more image frames may be acceptable as far as in-focus resolution. For example, an upper portion of the image 64b is slightly better resolved in a first image frame and a lower portion of the image 64b is slightly better resolved in a second image frame, but overall both image frames have acceptably good resolution. Thus, the focusing system 60 may select one of a number of image frames with "acceptable" in-focus resolution of the image 64b, even if the selected image frame is not, depending on the criteria used, the frame with the absolute best or optimal in-focus resolution.

The calibration method 100 of the present invention results in a reference point RP being determined for the moving lens 53 that provides for very good resolution of a target bar code positioned at the reference focal plane RFP when the moving lens 53 is positioned at the reference point RP and the target bar code is focused on the sensor array 28. The reference point RP is not necessarily the absolute optimal position for absolute optimal resolution of the target bar code onto the sensor array 28 when the bar code is at the reference focal plane RFP, the goal is good decodability of the imaged bar code 34a not necessarily absolute optical resolution.

Since the virtual image 64a substantially corresponds to the reference local plane RFP, the reference point RP of the moving lens 53 substantially corresponds to the reference focal plane RFP. That is, if the target bar code 34 were positioned at or coincident with the reference focal plane RFP, a sharply resolved image 34a of the target bar code 34a would be projected by the lens assembly 52 onto the sensor array 28 and the imaged bar code 34a would likely be decodable.

After the reference point RP (position X) of the moving lens 53 is established for the reference focal plane RFP, advantageously, the lens assembly 52 may be refocused to image a target bar code 34 at a distance from the lens assembly 52 other than the reference focal plane RFP without the necessity of iteratively searching for a sharp image each time a target bar code is presented for reading.

At step 170 of FIG. 10, if a target bar code 34 is presented for reading at a distance that is greater than or less than the distance of the reference focal plane RFP, the focusing system 60 employs a range finding or ranging methodology (such as laser ranging or a proximity sensor or some other technique) to determine a distance from the lens assembly 52 to the target bar code 34 and the moving lens 53 is moved from its current position directly to a target position along its path of travel PT where an acceptable in-focus image 34a of the target bar code 34 is achieved. That is, the moving lens 53 is moved by the focusing assembly 60 in one shot or movement from its current position to a target position where an acceptable image 34a of the target bar code 34 is achieved, thereby obviating the need for an iterative process of searching for an acceptable in-focus image such as used by prior art autofocusing systems.

The moving lens 53 may be positioned at reference point RP for each bar code reading session to facilitate movement of the moving lens 53 to a target position for imaging a target bar code 34 that is not at the reference focal plane RFP. When a target bar code 34 is presented to the reader at a distance (say D') from the lens assembly 52 along the optical axis OA that is different than the distance D to the reference focal plane position RFP and that is beyond the limits of the working range WR, the focusing system 60 moves the moving lens 53 from the reference position RP along its path of travel PT an amount, say ΔX, based on the difference between distances D and D', that is, how far the target object position has changed from the reference focal plane position RFP along the optical axis OA.

Based on feedback from a range finding method, the focusing system 60 moves the moving lens 53 a distance ΔX so that the image 34a of the target bar code 34 is at an acceptable in-focus resolution on the sensor array 28. Unlike conventional autofocus systems, the focusing system 60 of present invention avoids the necessity of analyzing successive image frames 74 generated by the imaging system 12 for decodability as the moving lens 53 is moved from its reference position RP along its path of travel PT. Even if some minor adjustment of the moving lens 53 is necessary from its target position to achieve improved resolution of the imaged target bar code 34a, such iterative refocusing and analysis of image frames would be done over a very short range of lens movement, as opposed to analyzing images over a full range of the moving lens 53.

As mentioned above, movement of the moving lens 53 from the reference position. RP may be accomplished by determining a distance to the target bar code 34, for example, by using laser ranging and moving the lens 53 appropriately from the reference position RP based on the determined distance to the target bar code 34. That is, depending on the distance differential between the reference focal plane RFP and the target bar code 34, the moving lens 53 will be moved by an amount ΔX. For example, the focusing system 60 may utilize the laser aiming system 45 in executing a laser ranging method or may use the output of a laser ranging system, as disclosed in the '792 application referenced above. The laser ranging information would be utilized by the focusing system 60 to determine a distance between the sensor array 28 and the target bar code 34 to facilitate accurately determining how much to move the moving lens 53 from its reference point or position RP when the bar code target 34 is at a distance other than the reference focal plane RFP.

Second Exemplary Embodiment

Figure 7:
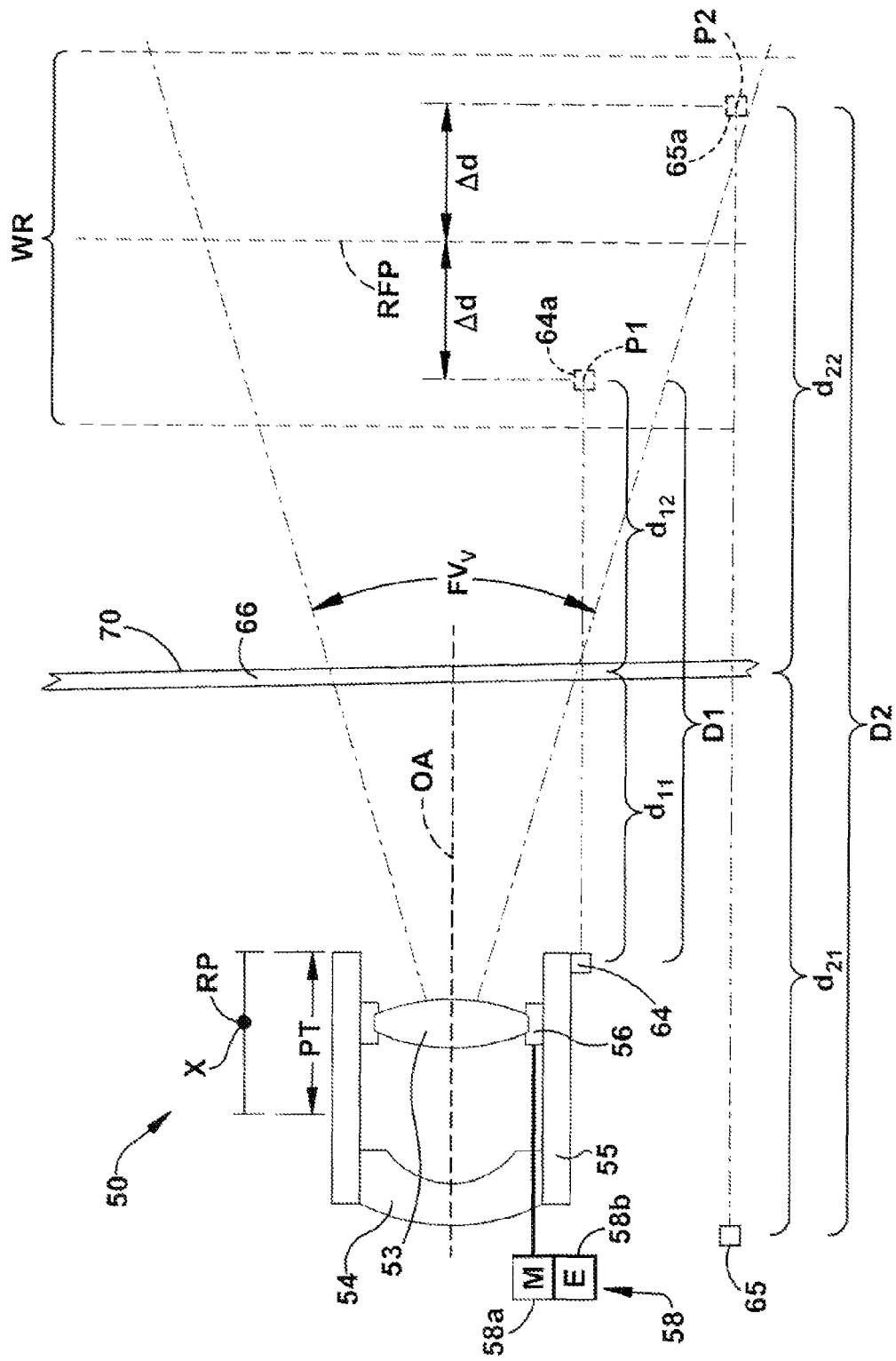
FIG. 7 is a schematic side elevation view of a second exemplary embodiment of a variable focus imaging lens system and focusing system of the present invention.

A second exemplary embodiment of the variable focus imaging lens assembly 50 of the present invention is shown schematically at 50 in FIG. 7. This embodiment is similar to the embodiment described above, but instead of the projection assembly having a single light source 64, the imaging projection assembly 62 utilizes a pair of illumination sources 64, 65. The light source 64 is projected by the window 70 such that a virtual image 64a of the light source 64 is focused at a predetermined position P1 within the field of view FV. As measured along the optic axis OA of the lens assembly 52, the virtual image 64a is at a distance D1 from the lens assembly 52, wherein D1=d11+d12. The distance d11 is a distance from the light source 64 to the window 70 and the distance d12 is a distance from the light source 64 to the predetermined position P1. Since the window 70 is a flat optic, d11=d12.

The illumination source 65 is projected by the window 70 such that a virtual image 65a of the illumination source 65 is focused at a predetermined position P2 within the field of view FV. As measured along the optic axis OA of the lens assembly 52, the virtual image 65a is at a distance D2 from the lens assembly 52, wherein D2=d21+d22. The distance d21 is a distance from the light source 64 to the window 70 and the distance d22 is a distance from the light source 64 to the predetermined position P2. Since the window 70 is a flat optic, d11=d12.

In one exemplary embodiment, a reference focal plane RFP is established at a position intermediate or half way between the virtual projections 64a, 65a, thus, the distance D from the lens assembly 52 to the reference focal plane RFP is the average of D1 and D2, namely, D=(D1+D2)/2. As see in FIG. 7, the reference focal plane RFP is a distance Δd from each of the virtual projections 64a, 65a, as measured along the optical axis OA. During the calibration process, as explained above, the focusing system 60 causes the moving leas 53 to be driven along its path of travel PT and the series of image frames 74 are analyzed to find the image frame that provides an acceptable images 64b, 65b (FIG. 7) of both virtual target projections or images 64a, 65a, for example, the focusing system 60 may seek to balance or equalize the sharpness of each of the virtual target images 64a, 64b.

Of course, this analysis of image resolution is done by the focusing system 60 with the realization that because the virtual projections 64a, 65a are at different distances D1, D2 from the lens assembly 52 as measured along the optic axis OA, no one image frame 74 will have both images 64b, 65b in completely sharp resolution or the best in-focus image, that is, the image frame selected as having an "acceptable" image will necessarily involve a compromise by the focusing system 60 between the resolution of two images 64a, 64b. As the resolution of one image 64b on the sensor array 28 improves as the moving lens 53 moves along the path of travel 53, the resolution of the second image 65b on the sensor array 28 will typically degrade. Thus, the focusing system 60 will select an image frame that has acceptable resolution of both images 64b, 65b.

Once an acceptable in-focus resolution of the images 64b, 65b are found, the process proceeds as described above to find the moving lens position X and establish this position X as the reference point RP corresponding to the reference focal plane RFP. The foregoing process of using two virtual projections 64a, 64b to determine a reference point RF is more robust and less prone to error than determining a reference point RF utilizing a single virtual projection as described in the first embodiment.

In another exemplary embodiment of the dual illumination source embodiment, the two virtual projections 64a, 64b may be used to establish two spaced apart reference planes, say RFP1 and RFP2, where RFP1 is closer to the lens assembly 52 and RFP2 is more distance from the lens assembly 52. The variable focusing system 60 would use these two reference planes RFP1 and RPF2 to establish two reference points or positions, say RF1 and RF2 for the moving lens 53 along its path of travel.

Determining and use of two reference points RP1, RP2 would be advantageous, if, for example, the reader were typically used for two types of bar code reading, e.g., relatively close up reading of target bar codes when the reader is used in the stationary mode and relatively long distance reader of target bar codes when the reader is used in the hand held mode for reading bar codes in a warehouse. Thus, if the reader 10 is reading a bar code that is positioned close to the camera assembly 20, the moving lens 53 would be moved to the first reference point RP1 and then the moving lens would be moved from the first reference position RP1, as described in the first embodiment, depending on the exact distance of the bar code from the camera assembly. On the other hand. If the reader 10 is reading a bar code that is positioned far from the camera assembly 20, the moving lens 53 would be moved to the second reference point RP2 and then the moving lens would be moved from the second reference position RP12, as described in the first embodiment, depending on the exact distance of the bar code from the camera assembly.

The working ranges associated with each of the reference positions RP1, RP2 would overlap some small amount to provide for an overall extended working range WR. Thus, when a target bar code 34 is presented for reading to the reader 10, the focusing system 60 would cycle through reference positions RP1, RP2 to determine which reference position should be selected to enhance rapid target acquisition. Of course, it should be recognized that the number of reference position may be more than two, depending on the specific applications the reader is intended to be used for.

Third Exemplary Embodiment

Figure 8:
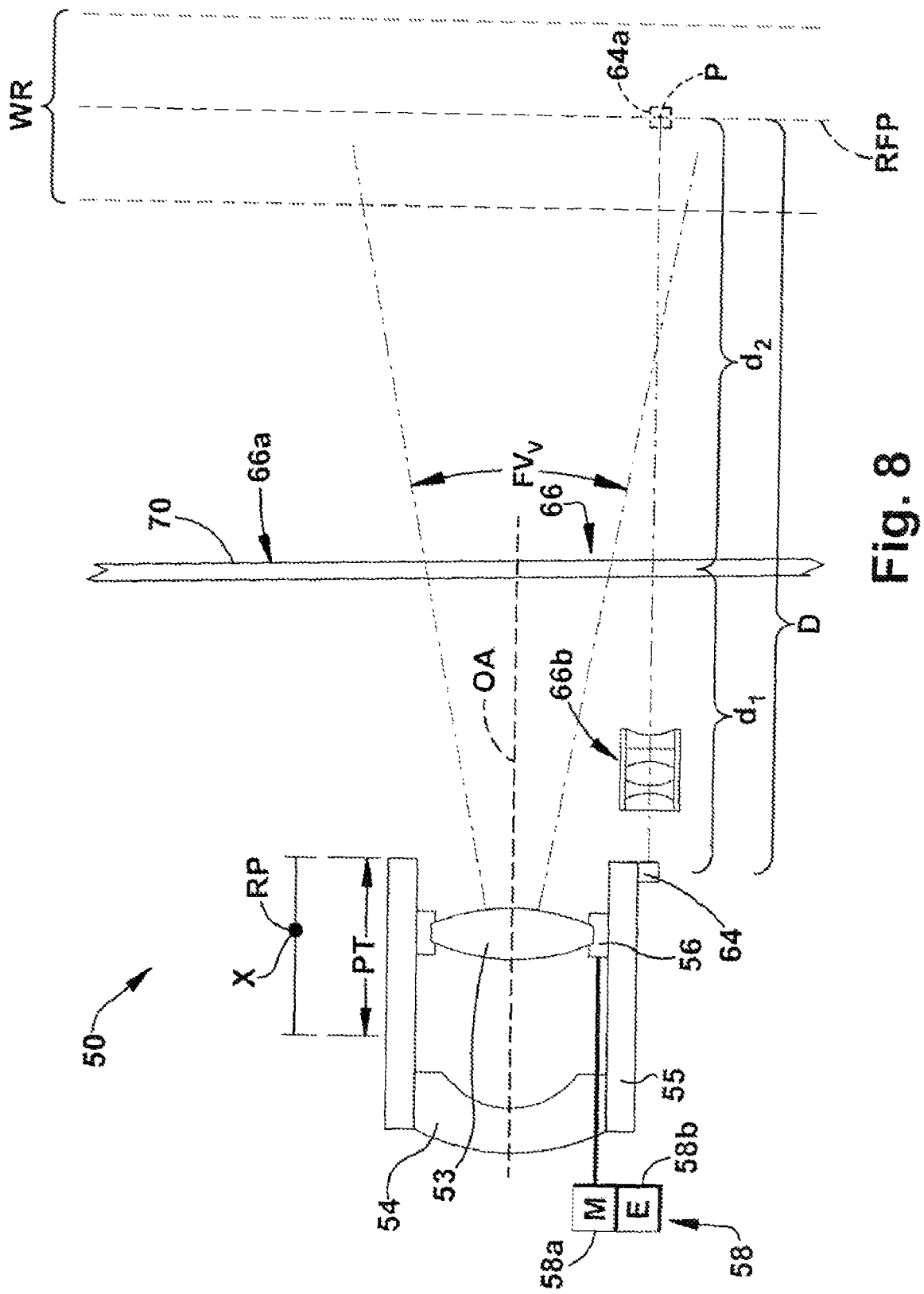
FIG. 8 is a schematic side elevation view of a third exemplary embodiment of a variable focus imaging lens system and focusing system of the present invention.

A third preferred embodiment of the variable focus imaging lens assembly is shown schematically at 50 in FIG. 8. This embodiment is similar to the first embodiment described above, but the optic element 65 of the projection assembly 62 comprises two optic elements 66a, 66b. The first optic element 66a is the exit window 70, as described above, with respect to the first embodiment. The second optic element 66b comprise one or more projection lenses which function to position the virtual image 64a of the light source 64 at a desired predetermined position P within the field of view FV at a distance D. In the first embodiment, because the flat exit window 70 has an optical power of one, in order to focus or projection the image projection at the distance D from the lens assembly 52 with respect to the optical axis OA, it was necessary to have the light source 64 a distance d1=½ D from the exit window 70 such that D=d1+d2 where d1=d2, as illustrated in FIG. 6.

Because the projection lenses 66b have an optic power other than one and a focal length other than infinity, the projection lenses 66b can be configured to project the image projection 64a of the light source 64 at any desired point P and any desired predetermined distance D without the necessity that the light source 64 be a distance d1=½ D from the exit window 70. Thus, as can be seen in FIG. 8, the distance d2 is much greater than, d1, d2>d1, based on the particular optical characteristics of the projection lenses 66b. Use of the projection lenses 66b is advantageous since given the size of the camera assembly housing 24 and the desired distance D, it may not be possible to position the light source 64 a sufficient distance from the exit window 70 such that d1=½ D. Thus, the projection lenses 66b permit the light source 64 to be positioned much closer to the exit window 70 while still resulting in the virtual image 64a to be imaged at the desired distance D from the lens assembly 52.

The remainder of the calibration process to determine the reference position RF is as described in the first embodiment and will not be repeated here.

Fourth Exemplary Embodiment

Figure 9:
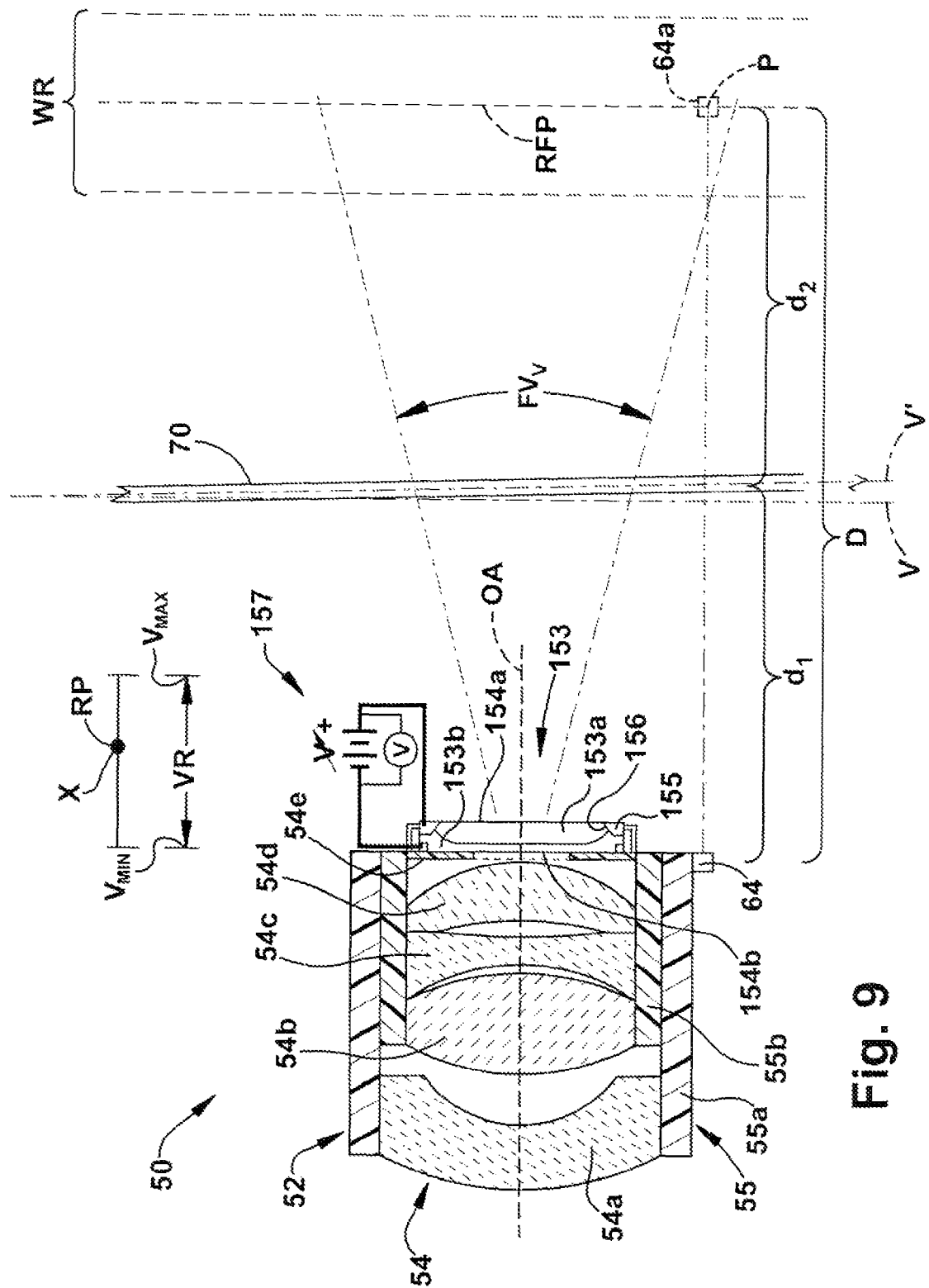
FIG. 9 is a schematic side elevation view of a fourth exemplary embodiment of a variable focus imaging lens system and focusing system of the present invention.

A fourth exemplary embodiment of the variable focus imaging lens assembly 50 of the present invention is shown schematically at 50 in FIG. 9. This embodiment is similar to the first embodiment described above; however, instead of a mechanical moving lens 53, a liquid lens 153 is utilized as the variable focus optic element of the lens assembly 52. It should be recognized, of course, that the liquid lens 153 may equally well be used in place of a mechanical moving lens in the configurations shown in the second, third, and fourth embodiments.

The lens assembly 52 includes a stationary lens assembly 54, that for illustrative purposes only comprise a set of fixed position lenses 54a, 54b, 54c, 54d and an aperture stop 54c at the front of the assembly 54. The stationary lens assembly 54 is supported in lens holders 55a, 55b. Affixed to a front distal portion of the inner support 55b is the liquid lens 55b.

The liquid lens 153 is an optic lens formed by two liquids 153a, 153b of equal density that are sandwiched between two windows 154a, 154b in a conical shaped interior region defined by an conductive annular ring 155 that has a slanted interior wall 156 defining a vessel. One liquid is typically water 153b and the other liquid is oil 153a. A variable voltage source 157 applies a voltage V across the conductive ring 155. Since water 153b is electrically conductive, the greater the voltage applied to the ring 155, the more water is attracted to and extends along the slanted interior wall 156 of the ring 155.

The migration of the water 153b along the interior wall 156 changes the shape of water-oil interface or boundary and thus the optical characteristics of the liquid lens 153. For example, at an applied voltage V of zero volts, the water-oil boundary is flat. As applied voltage V increases, water 153b is attracted to the ring 155 and migrates along the wall 156. This increase in volume of water 153b along the wall 156 causes the oil 153a to bow into a convex shape toward the middle of the lens, while the water 153b assumes a concave shape. This is convex-concave oil/water boundary is shown in schematic form in FIG. 9. The liquid lens 153 is used to provide enhanced focusing capabilities for the imaging lens system 52, particularly, the liquid lens 153 provides for a variable focusing by changing the applied voltage V which, in turn, changes the effective focal length of the liquid lens 153.

Additionally details of a liquid lens may be found in U.S. Pat. No. 7,201,318, entitled "Optical Adjustment for Increased Working Range and Performance in Electro-Optical Readers" issued on Apr. 10, 2007 and assigned to the assignee of the present invention. The '318 patent is incorporated herein in its entirety by reference.

With the liquid lens 153, the voltage V applied by the variable voltage source 157 to the liquid lens can be thought of as functioning like the drive mechanism 58 in the first embodiment, that is, as the drive mechanism 58 moves the moving lens along its path of travel PT in the first embodiment, the variable voltage source applies a varying voltage V to the liquid lens over a predetermined range of voltage that is determined by the voltage capabilities of the liquid lens 153. Thus, the calibration process is very similar to the calibration process 100 set forth above in the first embodiment. Recall that the reference point RF was determined as a position X along the path of travel PT of the moving lens 53 that corresponded to the reference focal plane RFP. In the liquid lens embodiment, the reference point RF is a reference voltage value which is determined as a voltage value X applied to the liquid lens 153 by the variable voltage source 157 within a range of voltages RV, extending between a minimum voltage value, Vmin, and a maximum voltage value, Vmax. The minimum and maximum voltage values establishing the range VR are determined by the electrical operating characteristics of the liquid lens 153.

The focusing system 60 undertakes the following steps in the calibration process for the liquid lens 153:

Energize the light source 64 to project the virtual image 64a of the light source 64 at a predetermined position P at distance D from lens assembly 52 within the field of view FV to establish reference focal plane RFP. Energize imaging system 12 to generate series of image frames 74 each including an image 64b of the virtual image 64a.

Vary the applied voltage V to the liquid lens 153 by controlling the variable power source 157 to change the voltage applied to the liquid lens 153 across the voltage range VR. Analyze the image 64b found in each of the series of image frames 75 to find an acceptable or suitable resolution of image 64b.

Determine a voltage value position X of the liquid lens within the voltage range VR corresponding to an acceptable resolution of image 64b. Use the determined voltage value X as reference voltage value RP for the liquid lens 153 corresponding to the reference focal plane RFP.

Since the window 70 is essentially a flat optic with minimal tilt, by simple geometry, if the distance between the light source 64 and the window 70 is d1, then a distance between the window and the virtual image 64a of the light source 64 is d2 wherein d1=d2. If the light source 64 is positioned substantially at an end of the lens assembly 52 (or the stationary lens holder 55), then the effective total distance D from the lens assembly 52 to the virtual image 64a would be substantially D=d1+d2 when that distance D is measured along the optical axis OA. The virtual image 64a of the light source 64 establishes an image point on what can be considered the reference focal plane RFP (orthogonal to the optic axis OA) for purposes of calibration of the liquid lens 53.

With the light source 64 and imaging system 12 both energized, the focusing system 60 varies the applied voltage V across the liquid lens 153. An image 64b (schematically shown in FIG. 6) of the virtual image 64a is projected onto the sensor array surface 28a by the lens assembly 52.

The focusing system 60 analyzes successive image frames 74 to find the applied voltage V that generates an image frame having an acceptable or suitable in-focus image of the virtual image 64a. An acceptable or suitable in-focus image of the virtual image 64a means that of the image frames analyzed by the focusing system 60, the "acceptable" frame is the frame that has the sharpest or best resolution of the virtual image 64a of those series frames 74 analyzed as the liquid lens 153 is driven across its voltage range VR, that is, from Vmin to Vmax.

The reference point or position RP is determined by the focusing system 60 to be the voltage value X applied to the liquid lens 153 that corresponds to the image frame 74 having the acceptable in-focus image 64b of the virtual image 64a.

The calibration method 100 of the present invention results in a reference point voltage value RP being determined for the liquid lens 153 that provides for very good resolution of a target bar code positioned at the reference focal plane RFP when the liquid lens 153 has applied to it the reference point voltage value RP and the imaged target bar code 34a is focused on the sensor array 28. Since the virtual image 64a substantially corresponds to the reference focal plane RFP, the reference point voltage value RP of the liquid lens 153 substantially corresponds to the reference focal plane RFP. That is, if the target bar code 34 were positioned at or coincident with the reference focal plane RFP, a sharply resolved image 34a of the target bar code 34a would be projected by the lens assembly 52 onto the sensor array 28 and the imaged bar code 34a would likely be decodable.

After the reference point voltage value RP (applied voltage X) of the liquid lens 153 is established for the reference focal plane RFP, the liquid lens 153 upon startup is has the reference point voltage RP applied to it. When a target bar code 34 is presented to the reader at a distance (say D') from the lens assembly 52 along the optical axis OA that is different than the distance D to the reference local plane position RFP, the focusing system 60, via a ranging method, as described above, determines the distance D' and utilizes the variable power supply 157 to change the applied voltage V to the liquid lens 153 to a target voltage value that results in a in-focus image 34a of the target bar code 34. For example, the focusing system 60 may, may change the applied voltage V from the reference position voltage value RP an amount, say ΔV, based on the difference between distances D and D', that is, how far the target object position has changed from the reference focal plane position RFP along the optical axis OA.

While the present invention has been described with a degree of particularity, it is the intent that the invention includes all modifications and alterations from the disclosed design falling with the spirit or scope of the appended claims.

I claim:

1. A variable focus imaging lens assembly for an imaging system of an imaging-based bar code reader, the imaging system generating image frames of a field of view of the imaging system and including an imaging sensor array, the variable focus imaging lens assembly comprising:
    a lens assembly focusing light from the field of view onto the sensor array, the lens assembly including a lens movable along a path of travel;
    a drive mechanism driving the moving lens along the path of travel;
    a focusing system establishing a reference point for the moving lens along the path of travel corresponding to a reference focal plane within the field of view;
    a projection assembly including a light source and an optic element, the projection assembly being configured to project light from the light source onto the optic element to generate a virtual target image in the form of backward propagating light originated from the optic element, the virtual target image being located at a predetermined position within the field of view and coincident with the reference focal plane, the predetermined position being a known distance from the lens assembly along an optic axis of the lens assembly; and
    the focusing system energizing the drive mechanism to drive the moving lens along the path of travel, analyzing successive image frames generated by the imaging system to determine an acceptable in-focus resolution of an image of the virtual target image of the light source and establishing the moving lens reference point at a position of the moving lens providing the acceptable in-focus resolution of the image of the light source virtual target image.

2. The variable focus imaging lens assembly of claim 1 wherein the moving lens path of travel is coincident with an optical axis of the lens assembly.

3. The variable focus imaging lens assembly of claim 1 wherein the optic element comprises an exit window of the bar code reader.

4. The variable focus imaging lens assembly of claim 1 wherein the projection assembly includes the light source positioned outside of the field of view.

5. The variable focus imaging lens assembly of claim 1 wherein the optic element is adjacent to the light source to project the virtual target image to the predetermined position.

6. A variable focus imaging lens assembly for an imaging system of an imaging-based bar code reader, the imaging system generating image frames of a field of view of the imaging system and including an imaging sensor array, the variable focus imaging lens assembly comprising:
    a lens assembly focusing light from the field of view onto the sensor array, the lens assembly including a lens movable along a path of travel;
    a drive mechanism driving the moving lens along the path of travel;
    a focusing system establishing a reference point for the moving lens along the path of travel corresponding to a reference focal plane within the field of view;
    an projection assembly including an optic element, the projection assembly being configured to project light forwardly onto the optic element to generate first and second virtual target images in the form of backward propagating light originated from the optic element, the virtual target image being respectively located at first and second predetermined positions within the field of view, the first and second predetermined positions being in proximity to and on opposite sides of the reference focal plane, the reference focal plane being a known distance from the lens assembly along an optic axis of the lens assembly;

the focusing system energizing the drive mechanism to drive the moving lens along the path of travel, analyzing successive image frames generated by the imaging system to determine an acceptable in-focus resolution of an image of the first and second virtual target images of the first and second light sources and establishing the moving lens reference point at a position of the moving lens providing the acceptable in-focus resolution of the image of the first and second light source virtual target images.

7. The variable focus imaging lens assembly of claim 6 wherein the moving lens path of travel is coincident with an optical axis of the lens assembly.

8. The variable focus imaging lens assembly of claim 6 wherein the optic element comprises an exit window of the bar code reader.

9. The variable focus imaging lens assembly of claim 6 wherein the projection assembly includes the light sources positioned outside of the field of view.

10. The variable focus imaging lens assembly of claim 6 wherein the optic element is adjacent to the first and second light sources to project the first and second virtual target images to the respective predetermined positions.

11. An imaging-based bar code reader comprising:
an imaging system generating image frames of a field of view of the imaging system and including an imaging sensor array; and
a variable focus imaging lens assembly for focusing light from the field of view onto the sensor array, the variable focus imaging lens assembly including:
  a lens assembly focusing light from the field of view onto the sensor array, the lens assembly including a lens movable along a path of travel;
  a drive mechanism driving the moving lens along the path of travel;
  a focusing system establishing a reference point for the moving lens along the path of travel corresponding to a reference focal plane within the field of view;
  a projection assembly including a light source and an optic element, the projection assembly being configured to project light from the light source onto the optic element to generate a virtual target image in the form of backward propagating light originated from the optic element, the virtual target image being located at a predetermined position within the field of view and coincident with the reference focal plane, the predetermined position being a known distance from the lens assembly along an optic axis of the lens assembly; and
  the focusing system energizing the drive mechanism to drive the moving lens along the path of travel, analyzing successive image frames generated by the imaging system to determine an acceptable in-focus resolution of an image of the virtual target image of the light source and establishing the moving lens reference point at a position of the moving lens providing the acceptable in-focus resolution of the image of the light source virtual target image.

12. The imaging-based bar code reader of claim 11 wherein the moving lens path of travel is coincident with an optical axis of the lens assembly.

13. The imaging-based bar code reader of claim 11 wherein the optic element comprises an exit window of the bar code reader.

14. The imaging-based bar code reader of claim 11 wherein the projection assembly includes the light source positioned outside of the field of view.

15. The imaging-based bar code reader of claim 11 wherein the optic element is adjacent to the light source to project the virtual target image to the predetermined position.

16. A method of establishing a reference position along a path of travel of a moving lens of a variable focus imaging lens assembly for focusing light from the field of view onto the sensor array, the steps of the method comprising:
providing an imaging system generating image frames of a field of view of the imaging system and including an imaging sensor array;
providing the variable focus imaging lens assembly including: a lens assembly focusing light from the field of view onto the sensor array, the lens assembly including a lens movable along a path of travel; a drive mechanism driving the moving lens along the path of travel; a focusing system establishing a reference point for the moving lens along the path of travel corresponding to a reference focal plane within the field of view; a projection assembly including a light source and an optic element, the projection assembly being configured to project light from the light source onto the optic element to generate a virtual target image in the form of backward propagating light originated from the optic element, the virtual target image being located at a predetermined position within the field of view and coincident with the reference focal plane, the predetermined position being a known distance from the lens assembly along an optic axis of the lens assembly; and the focusing system energizing the drive mechanism to drive the moving lens along the path of travel, analyzing successive image frames generated by the imaging system to determine an acceptable in-focus resolution of an image of the virtual target image of the light source and establishing the moving lens reference point at a position of the moving lens providing the acceptable in-focus resolution of the image of the light source virtual target image
energizing the drive mechanism to drive the moving lens along the path of travel;
analyzing successive image frames generated by the imaging system to determine an acceptable in-focus resolution of an image of the virtual target image of the light source; and
establishing the moving lens reference point at a position of the moving lens providing the acceptable in-focus resolution of the image of the light source virtual target image.

17. A variable focus imaging lens assembly for an imaging system of an imaging-based bar code reader, the imaging system generating image frames of a field of view of the imaging system and including an imaging sensor array, the variable focus imaging lens assembly comprising:
lens assembly means for focusing light from the field of view onto the sensor array and including a movable lens means movable along a path of travel;
drive mechanism means for driving the movable lens means along the path of travel;
focusing system means establishing a reference point for the moving lens means along the path of travel corresponding to a reference focal plane within the field of view;

projection assembly means including a light source and an optic element, the projection assembly means being configured to project light from the light source onto the optic element to generate a virtual target image in the form of backward propagating light originated from the optic element, the virtual target image being located at a predetermined position within the field of view and coincident with the reference focal plane, the predetermined position being a known distance from the lens assembly means along an optic axis of the lens assembly; and the focusing system means energizing the drive mechanism means to drive the moving lens means along the path of travel, analyzing successive image frames generated by the imaging system to determine an acceptable in-focus resolution of an image of the virtual target image of the light source and establishing the moving lens reference point at a position of the moving lens means providing the acceptable in-focus resolution of the image of the light source virtual target image.

18. A variable focus imaging lens assembly for an imaging system of an imaging-based bar code reader, the imaging system generating image frames of a field of view of the imaging system and including an imaging sensor array, the variable focus imaging lens assembly comprising:

a lens assembly focusing light from the field of view onto the sensor array, the lens assembly including a liquid lens whose optical characteristics vary with a voltage applied to the liquid lens;

a variable voltage source for applying a voltage to the liquid lens;

a focusing system establishing a reference voltage for the liquid lens corresponding to a reference focal plane within the field of view;

a projection assembly including a light source and an optic element, the projection assembly being configured to project light from the light source onto the optic element to generate a virtual target image in the form of backward propagating light originated from the optic element, the virtual target image being located at a predetermined position within the field of view and coincident with the reference focal plane, the predetermined position being a known distance from the lens assembly along an optic axis of the lens assembly; and the focusing system energizing the variable voltage source to vary the voltage applied to the liquid lens, analyzing successive image frames generated by the imaging system to determine an acceptable in-focus resolution of an image of the virtual target image of the light source and establishing the voltage reference point at a voltage applied to the liquid lens providing the acceptable in-focus resolution of the image of the light source virtual target image.

19. The variable focus imaging lens assembly of claim 18 wherein the optic element comprises an exit window of the bar code reader.

20. The variable focus imaging lens assembly of claim 18 wherein the projection assembly includes the light source positioned outside of the field of view.

21. The variable focus imaging lens assembly of claim 18 wherein the optic element is adjacent to the light source to project the virtual target image to the predetermined position.

22. An imaging-based bar code reader comprising:

an imaging system generating image frames of a field of view of the imaging system and including an imaging sensor array; and a variable focus imaging lens assembly for focusing light from the field of view onto the sensor array, the variable focus imaging lens assembly including:

a lens assembly focusing light from the field of view onto the sensor array, the lens assembly including a liquid lens whose optical characteristics vary with a voltage applied to the liquid lens;

a variable voltage source for applying a voltage to the liquid lens;

a focusing system establishing a reference voltage for the liquid lens corresponding to a reference focal plane within the field of view;

a projection assembly including a light source and an optic element, the projection assembly being configured to project light from the light source onto the optic element to generate a virtual target image in the form of backward propagating light originated from the optic element, the virtual target image being located at a predetermined position within the field of view and coincident with the reference focal plane, the predetermined position being a known distance from the lens assembly along an optic axis of the lens assembly; and the focusing system energizing the variable voltage source to vary the voltage applied to the liquid lens, analyzing successive image frames generated by the imaging system to determine an acceptable in-focus resolution of an image of the virtual target image of the light source and establishing the voltage reference point at a voltage applied to the liquid lens providing the acceptable in-focus resolution of the image of the light source virtual target image.

23. The imaging-based bar code reader of claim 22 wherein the projection assembly includes an optic element comprising an exit window of the bar code reader.

24. The imaging-based bar code reader of claim 23 wherein the projection assembly includes the light source positioned outside of the field of view.

25. The imaging-based bar code reader of claim 24 wherein the projection assembly includes an optic element adjacent the light source to project the virtual target image to the predetermined position.

* * * * *